United States Patent
Huang et al.

(10) Patent No.: US 9,502,933 B2
(45) Date of Patent: Nov. 22, 2016

(54) PERMANENT MAGNET SYNCHRONOUS ELECTRIC MACHINE

(75) Inventors: Hui Huang, Guangdong (CN);
Yusheng Hu, Guangdong (CN);
(Continued)

(73) Assignees: Gree Electric Appliances, Inc. of Zhuhai, Zhuhai, Guangdong (CN);
(Continued)

( * ) Notice: Subject to any disclaimer, the term of this patent is extended or adjusted under 35 U.S.C. 154(b) by 382 days.

(21) Appl. No.: 14/235,574

(22) PCT Filed: Aug. 31, 2011

(86) PCT No.: PCT/CN2011/079169
§ 371 (c)(1),
(2), (4) Date: Jan. 28, 2014

(87) PCT Pub. No.: WO2013/020314
PCT Pub. Date: Feb. 14, 2013

(65) Prior Publication Data
US 2014/0145539 A1 May 29, 2014

(30) Foreign Application Priority Data
Aug. 5, 2011 (CN) .......................... 2011 1 0223492

(51) Int. Cl.
*H02K 1/27* (2006.01)
(52) U.S. Cl.
CPC ................... *H02K 1/2766* (2013.01)
(58) Field of Classification Search
CPC ............ H02K 1/27; H02K 1/22; H02K 21/12; H02K 21/14; H02K 29/03; H02K 1/32
(Continued)

(56) References Cited

U.S. PATENT DOCUMENTS

| 4,358,697 A | 11/1982 | Liu et al. |
| 4,924,130 A * | 5/1990 | Fratta ................... H02K 1/2766 310/156.53 |

(Continued)

FOREIGN PATENT DOCUMENTS

| CN | 1149778 | 5/1997 |
| CN | 1243351 | 2/2000 |

(Continued)

OTHER PUBLICATIONS

International Search Report issued by the State Intellectual Property Office of the P.R. China (Chinese language), dated Mar. 28, 2012, for related International Application No. PCT/CN2011/079169; 5 pages.

(Continued)

*Primary Examiner* — Tran Nguyen
(74) *Attorney, Agent, or Firm* — Faegre Baker Daniels LLP

(57) ABSTRACT

A permanent magnet synchronous electric machine includes a stator and a rotor. Multiple wire grooves are provided peripherally on the stator, coils are provided within the wire grooves, and a stator tooth is provided between adjacent wire grooves. Multiple magnetic groove sets are provided peripherally within the rotor, each of the magnetic groove sets includes at least two magnetic steel grooves, with permanent magnets placed within the magnetic steel grooves, and a magnetic tunnel formed between the magnetic steel grooves. Of two adjacent magnetic tunnels, an end of one magnetic tunnel is opposite a wire groove and an end of the other magnetic tunnel is opposite a stator tooth. The permanent magnet synchronous electric machine has a more steady output torque, and also reduces the noise and vibration provided during operation.

6 Claims, 2 Drawing Sheets

(75) Inventors: Dongsuo Chen, Guangdong (CN);
Huajie Chen, Guangdong (CN); Yong Xiao, Guangdong (CN); Xueying Zeng, Guangdong (CN); Wenming Zhang, Guangdong (CN)

(73) Assignees: Gree Green Refrigeration Technology Center Co., Ltd. of Zhuhai, Zhuhai, Guangdong (CN)

(58) Field of Classification Search
USPC .................................. 310/156.53–156.57
See application file for complete search history.

(56) References Cited

U.S. PATENT DOCUMENTS

| | | | |
|---|---|---|---|
| 5,818,140 A | 10/1998 | Vagati | |
| 5,903,080 A | 5/1999 | Nashiki et al. | |
| 5,945,760 A * | 8/1999 | Honda | H02K 1/276 310/156.53 |
| 6,218,753 B1 | 4/2001 | Asano et al. | |
| 6,239,526 B1 | 5/2001 | Oh et al. | |
| 6,630,762 B2 * | 10/2003 | Naito | H02K 15/03 310/156.53 |
| 6,703,744 B2 | 3/2004 | Yoshinaga et al. | |
| 6,815,859 B2 | 11/2004 | Sakuma et al. | |
| 6,836,045 B2 | 12/2004 | Murakami et al. | |
| 7,019,426 B2 | 3/2006 | Mori | |
| 7,902,710 B2 * | 3/2011 | Han | H02K 1/2766 310/156.36 |
| 7,939,982 B2 | 5/2011 | Horst | |
| 7,981,359 B2 | 7/2011 | Masuzawa et al. | |
| 8,772,994 B2 | 7/2014 | Feng | |
| 2002/0089251 A1 | 7/2002 | Tajima et al. | |
| 2002/0153796 A1 | 10/2002 | Yoshinaga | |
| 2002/0175583 A1 | 11/2002 | Kikuchi et al. | |
| 2003/0030343 A1 | 2/2003 | Naito et al. | |
| 2003/0094875 A1 * | 5/2003 | Sakuma | H02K 1/276 310/156.56 |
| 2005/0110355 A1 * | 5/2005 | Sakuma | H02K 21/14 310/156.53 |
| 2006/0103254 A1 | 5/2006 | Horst | |
| 2006/0145561 A1 | 7/2006 | Sakuma | |
| 2007/0096579 A1 * | 5/2007 | Aydin | H02K 1/2766 310/156.56 |
| 2010/0052455 A1 | 3/2010 | Feng | |
| 2010/0141076 A1 * | 6/2010 | Blissenbach | H02K 1/2766 310/156.53 |
| 2014/0152139 A1 | 6/2014 | Huang et al. | |

FOREIGN PATENT DOCUMENTS

| | | |
|---|---|---|
| CN | 1158741 C | 3/2001 |
| CN | 1388625 | 1/2003 |
| CN | 1405948 | 3/2003 |
| CN | 2560153 | 7/2003 |
| CN | 1505239 | 6/2004 |
| CN | 2681433 | 2/2005 |
| CN | 101026318 | 8/2007 |
| CN | 101304204 | 11/2008 |
| CN | 101359847 | 2/2009 |
| CN | 101488679 | 7/2009 |
| CN | 101714805 | 5/2010 |
| CN | 101777809 | 7/2010 |
| CN | 102111051 | 6/2011 |
| CN | 202142924 | 2/2012 |
| CN | 202142925 | 2/2012 |
| CN | 202142926 | 2/2012 |
| CN | 202145610 | 2/2012 |
| CN | 202145611 U | 2/2012 |
| CN | 202260714 | 5/2012 |
| CN | 102769365 | 11/2012 |
| EP | 0746079 | 12/1996 |
| EP | 1283581 | 2/2003 |
| JP | 09233744 | 9/1997 |
| JP | 09308198 | 11/1997 |
| JP | 11-275783 | 10/1999 |
| JP | 2001178045 | 6/2001 |
| JP | 2002272031 | 9/2002 |
| JP | 2003264974 | 9/2003 |
| JP | 2009044860 | 2/2009 |
| JP | 2010213553 | 9/2010 |
| JP | 2010226784 | 10/2010 |
| JP | 2011083066 A | 4/2011 |

OTHER PUBLICATIONS

International Search Report issued by the State Intellectual Property Office of the P.R. China (English language), dated Mar. 28, 2012, for related International Application No. PCT/CN2011/079169; 3 pages.

International Search Report issued by the State Intellectual Property Office of P.R. China (Chinese language), Nov. 24, 2011, for related International Application No. PCT/CN2011/079181; 3 pages.

English translation of the International Search Report issued by the State Intellectual Property Office of P.R. China, Nov. 24, 2011, for related International Application No. PCT/CN2011/079181; 3 pages.

International Preliminary Report on Patentability and Written Opinion issued by the State Intellectual Property Office of the P.R. China (English language), dated Jan. 28, 2014, for related International Application No. PCT/CN2011/079181; 6 pages.

Written Opinion issued by the State Intellectual Property Office of the P.R. China (Chinese language), dated Nov. 24, 2011, for related International Application No. PCT/CN2011/079181; 4 pages.

English translation of the Written Opinion issued by the State Intellectual Property Office of the P.R. China, dated Nov. 24, 2011, for related International Application No. PCT/CN2011/079181; 4 pages.

International Preliminary Report on Patentability and Written Opinion issued by the State Intellectual Property Office of the P.R. China, dated Feb. 11, 2014, for related International Application No. PCT/CN2011/079169; 6 pages.

Written Opinion (Chinese language) issued by the State Intellectual Property Office of the P.R. China, dated Apr. 26, 2012, for related International Application No. PCT/CN2011/079169; 5 pages.

English translation of the Written Opinion issued by the State Intellectual Property Office of the P.R. China, dated Apr. 26, 2012, for related International Application No. PCT/CN2011/079169; 6 pages.

International Search Report issued by the State Intellectual Property Office of the P.R. China (Chinese language), dated Apr. 11 2012, for related International Application No. PCT/CN2011/079062; 6 pages.

English translation of the International Search Report issued by the State Intellectual Property Office of the P.R. China, dated Apr. 11 2012, for related International Application No. PCT/CN2011/079062; 4 pages.

International Preliminary Report on Patentability and Written Opinion issued by the State Intellectual Property Office of the P.R. China, dated Feb. 11, 2014, for related International Application No. PCT/CN2011/079062; 6 pages.

Written Opinion (Chinese language) issued by the State Intellectual Property Office of the P.R. China, dated May 17, 2012, for related International Application No. PCT/CN2011/079062; 5 pages.

English translation of the Written Opinion issued by the State Intellectual Property Office of the P.R. China, dated May 17, 2012, for related International Application No. PCT/CN/2011/079062; 8 pages.

International Search Report issued by the State Intellectual Property Office of the P.R. China (Chinese language), dated Apr. 11, 2012, for related International Application No. PCT/CN2011/079059; 5 pages.

English translation of the International Search Report issued by the State Intellectual Property Office of the P.R. China, dated Apr. 11, 2012, for related International Application No. PCT/CN2011/079059; 4 pages.

(56) References Cited

OTHER PUBLICATIONS

International Preliminary Report on Patentability and Written Opinion issued by the State Intellectual Property Office of the P.R. China, dated Feb. 11, 2014, for related International Application No. PCT/CN2011/079059; 6 pages.
Written Opinion (Chinese language) issued by the State Intellectual Property Office of the P.R. China, dated May 3, 2012, for related International Application No. PCT/CN2011/079059; 5 pages.
English translation of the Written Opinion issued by the State Intellectual Property Office of the P.R. China, dated May 23, 2012, for related International Application No. PCT/CN2011/079059; 8 pages.
International Search Report (Chinese language) issued by the State Intellectual Property Office of the P.R. China, dated Apr. 4, 2012, for related International Application No. PCT/CN2011/079064; 5 pages.
English translation of the International Search Report issued by the State Intellectual Property Office of the P.R. China, dated Apr. 4, 2012, for related International Application No. PCT/CN2011/079064; 3 pages.
International Preliminary Report on Patentability and Written Opinion issued by the State Intellectual Property Office of the P.R. China (with English translation), dated Feb. 11, 2014, for related International Application No. PCT/CN2011/079064, 15 pgs.
Written Opinion issued by the State Intellectual Property Office of the P.R. China (Chinese language), dated May 10, 2014, for related International Application No. PCT/CN2011/079064; 5 pages.
English translation of the Written Opinion issued by the State Intellectual Property Office of the P.R. China, dated May 10, 2012, for related International Application No. PCT/CN2011/079064; 8 pages.
International Search Report issued by the State Intellectual Property Office of the P.R. China (Chinese language), dated Apr. 1, 2012, for related International Application No. PCT/CN2011/079060; 4 pages.
English translation of the International Search Report issued by the State Intellectual Property Office of the P.R. China, dated Apr. 1, 2012, for related International Application No. PCT/CN2011/079060; 2 pages.
International Preliminary Report on Patentability and Written Opinion issued by the State Intellectual Property Office of the P.R. China, dated Feb. 11, 2014, for related International Application No. PCT/CN2011/079060; 4 pages.
Written Opinion (Chinese language) issued by the State Intellectual Property Office of the P.R. China, dated May 10, 2012, for related International Application No. PCT/CN2011/079060; 3 pages.
English translation of the Written Opinion issued by the State Intellectual Property Office of the P.R. China, dated May 10, 2012, for related International Application No. PCT/CN2011/079060; 4 pages.
First Examination Report (Chinese language) issued by the State Intellectual Property Office of the People's Republic of China, dated Feb. 7, 2013, for Chinese Patent Application No. 201110212590.0 (English Summary attached), Publication No. CN 102769365A; available at the European Patent Register at https://register.epo.org; 6 pages.
English translation of the First Examination Report issued by the State Intellectual Property Office of the P.R. China, dated Feb. 7, 2013, for Chinese Patent Application No. 2011102123590.0, Publication No. CN 102769365A; available at the European Patent Register at https://register.epo.org; 5 pages.
Second Examination Report (Chinese language) issued by the State Intellectual Property Office of the P.R. of China, dated Apr. 2, 2013, for Chinese Patent Application No. 201110212590.0 (English Summary attached), Publication No. CN 102769365A; available at the European Patent Register at https://register.epo.org; 6 pages.
English translation of the Second Examination Report issued by the State Intellectual Property Office of the P.R. China, dated Apr. 2, 2013, for Chinese Patent Application No. 201110212590.0, Publication No. CN 102769365A; available at the European Patent Register at https://register.epo.org; 5 pages.
Third Examination Report (Chinese language) issued by the State Intellectual Property Office of the People's Republic of China, dated Jun. 20, 2013, for Chinese Patent Application No. 201110212590.0 (English summary attached), Publication No. CN 102769365A; available at the European Patent Register at https://register.epo.org; 5 pages.
English translation of the Third Examination Report issued by the State Intellectual Property Office of the P.R. China, dated Jun. 20, 2013, for Chinese Patent Application No. 201110212590.0, Publication No. CN 102769365A; available at the European Patent Register at https://register.epo.org; 6 pages.
Search Report issued by the State Intellectual Property Office of the P.R. China, dated Jan. 24, 2013, for Chinese Patent Application No. 201110212590.0; Publication No. CN 102769365A; available at the European Patent Register at https://register.epo.org; 2 pages.
Supplemental Search Report issued by the State Intellectual Property Office of the P.R. China, dated Mar. 25, 2013, for Chinese Patent Application No. 201110212590.0, Publication No. CN 102769365A; available at the European Patent Register at https://register.epo.org; 1 page.
Examination Report (Chinese language) issued by the State Intellectual Property Office of the P.R. China, dated Feb. 8, 2013, for Chinese Patent Application No. 201110223492.7, Publication No. CN 102790502A; available at the European Patent Register at https://register.epo.org; 4 pages.
English translation of the Examination Report issued by the State Intellectual Property Office of the P.R. China, dated Feb. 8, 2013, for Chinese Patent Application No. 201110223492.7, Publication No. CN 102790502A; available at the European Patent Register at https://register.epo.org; 5 pages.
Search Report issued by the State Intellectual Property Office of the P.R. China, dated Jan. 31, 2013, for Chinese Patent Application No. 201110223492.7, Publication No. CN 102790502A; available at the European Patent Register at https://register.epo.org; 1 page.
Supplemental Search Report issued by the State Intellectual Property Office of the P.R. China, dated Nov. 1, 2013, for Chinese Patent Application No. 201110223492.7, Publication No. CN 102790502A; available at the European Patent Register at https://register.epo.org; 1 page.
Examination Report (Chinese language) issued by the State Intellectual Property Office of the P.R. China, dated Feb. 1, 2013, for Chinese Patent Application No. 201110224896.8, Publication No. CN 102761183A; available at the European Patent Register at https://register.epo.org; 8 pages.
English translation of the Examination Report issued by the State Intellectual Property Office of the P.R. China, dated Feb. 1, 2013, for Chinese Patent Application No. 201110224896.8, Publication No. CN 102761183A; available at the European Patent Register at https://register.epo.org; 9 pages.
Search Report issued by the State Intellectual Property Office of the p. R China, dated Jan. 23, 2013, for Chinese Patent Application No. 201110224896.8, Publication No. CN 102761183A; available at the European Patent Register at https://register.epo.org; 4 pages.
First Examination Report (Chinese language) issued by the State Intellectual Property Office of the P.R. China, dated Mar. 8, 2013, for Chinese Patent Application No. 201110224391.1, Publication No. CN 102801235A; available at the European Patent Register at https://register.epo.org; 5 pages.
English translation of the First Examination Report issued by the State Intellectual Property Office of the P.R. China, dated Mar. 8, 2013, for Chinese Patent Application No. 201110224391.1, Publication No. CN 102801235A; available at the European Patent Register at https://register.epo.org; 7 pages.
Second Examination Report (Chinese language) issued by the State Intellectual Property Office of the P.R. China, dated May 15, 2013, for Chinese Patent Application No. 201110224391.1, Publication No. CN 102801235A; available at the European Patent Register at https://register.epo.org; 4 pages.
English translation of the Second Examination Report issued by the State Intellectual Property Office of the P.R. China, dated May 15, 2013, for Chinese Patent Application No. 201110224391.1, Publi-

(56) References Cited

OTHER PUBLICATIONS cation No. CN 102801235A; available at the European Patent Register at https://register.epo.org; 5 pages.

Search Report issued by the State Intellectual Property Office of the P.R. China, dated Feb. 28, 2013, for Chinese Patent Application No. 201110224391.1, Publication No. CN 102801235A; available at the European Patent Register at https://register.epo.org; 1 page.

First Examination Report (Chinese language) issued by the State Intellectual Property Office of the P.R. China, dated Feb. 16, 2013, for Chinese Patent Application No. 201110224882.6 (English Summary attached), Publication No. CN 102780291A; available at the European Patent Register at https://register.epo.org; 8 pages.

English translation of the First Examination Report issued by the State Intellectual Property Office of the P.R. China, dated Feb. 16, 2013, for Chinese Patent Application No. 201110224882.6, Publication No. CN 102780291A; available at the European Patent Register at https://register.epo.org; 8 pages.

Second Examination Report (Chinese language) issued by the State Intellectual Property Office of the P.R. China, dated Apr. 18, 2013, for Chinese Patent Application No. 201110224882.6, Publication No. CN 102780291A; available at the European Patent Register at https://register.epo.org; 6 pages.

English translation of the Second Examination Report issued by the State Intellectual Property Office of the P.R. China, dated Apr. 18, 2013, for Chinese Patent Application No. 201110224882.6, Publication No. CN 102780291A; available at the European Patent Register at https://register.epo.org; 7 pages.

Search Report issued by the State Intellectual Property Office of the P.R. China, dated Feb. 1, 2013, for Chinese Patent Application No. 201110224882.6, Publication No. CN 102780291A; available at the European Patent Register at https://register.epo.org; 2 pages.

Supplemental Search Report issued by the State Intellectual Property Office of the P.R. China, dated Apr. 10, 2013, for Chinese Patent Application No. 201110224882.6, Publication No. CN 102780291A; available at the European Patent Register at https://register.epo.org; 1 page.

Examination Report (Chinese language) issued by the State Intellectual Property Office of the P.R. China, dated Jan. 4, 2013, for Chinese Patent Application No. 201110224395.X, Publication No. CN 102761182A; available at the European Patent Register at https://register.epo.org; 4 pages.

English translation of the Examination Report issued by the State Intellectual Property Office of the P.R. China, dated Jan. 4, 2013, for Chinese Patent Application No. 201110224395.X, Publication No. CN 102761182A; available at the European Patent Register at https://register.epo.org; 4 pages.

Search Report issued by the State Intellectual Property Office of the P.R. China, dated Dec. 25, 2012, for Chinese Patent Application No. 201110224395.X, Publication No. CN 102761182A; available at the European Patent Register at https://register.epo.org; 1 page.

\* cited by examiner

PERMANENT MAGNET SYNCHRONOUS ELECTRIC MACHINE

CROSS-REFERENCE TO RELATED APPLICATIONS

This application is a National Stage application of PCT international application PCT/CN2011/079169, filed on Aug. 31, 2011 which claims the priority to Chinese Patent Application No. 201110223492.7, entitled "PERMANENT MAGNET SYNCHRONOUS ELECTRIC MACHINE", filed with the Chinese Patent Office on Aug. 5, 2011, both of which are incorporated herein by reference in their entirety.

TECHNICAL FIELD

The present application relates to a permanent magnet synchronous motor.

BACKGROUND

A permanent magnet synchronous motor includes a stator and a rotor. Magnetic steel grooves are arranged in the rotor, and permanent magnets are provided in the magnet steel slots. During the operation, the rotor is driven to run by a permanent magnet torque and a reluctance torque. An output torque of the permanent magnet synchronous motor is illustrated in the following formula:

$$T = mp(L_q - L_d)i_d i_q + mp\Psi_{PM} i_q$$

where, the first item in the formula, $mp(L_q-L_d)i_d i_q$ is the reluctance torque; the second item in the formula, $mp\Psi_{PM}i_q$ is the permanent magnet torque; $\Psi_{PM}$ is a maximum value of stator-rotor coupling magnetic flux generated by the permanent magnets; m is the phase number of a conductor of the stator conductor; p is the number of pole-pairs of the motor; $L_d$ and $L_q$ are inductances along d-axis and q-axis respectively; and $i_d$ and $i_q$ are components of an armature current in the directions of d-axis and q-axis.

In practice, multiple stator teeth are provided on the stator of the permanent magnet synchronous motor, and multiple magnetic tunnels are formed in the stator. The magnetic flux lines are formed between the stator and the rotor (especially between the stator teeth and the magnetic tunnels). Thus, a torque for driving the rotor turning is formed by the full utilization of the reluctance torque. In an existing permanent magnet synchronous motor, there is an arbitrary corresponding relationship between the stator tooth and the magnetic tunnel, which determines the distribution of magnetic flux lines and the value of permanent magnet torque. In this way, an instable output torque and a large noise and vibration may be produced in the permanent magnet synchronous motor with the existing structure.

SUMMARY

A permanent magnet synchronous motor is provided according to the disclosure, which provides a stable output torque and reduces the noise and vibration in the running.

The technical solution is as follows:

A permanent magnet synchronous motor includes a stator and a rotor, a plurality of wire grooves are provided in the stator along a circumferential direction of the stator, coils are provided in each of the wire grooves, and a stator tooth is provided between adjacent wire grooves; a plurality of magnetic groove sets are provided in the rotor along a circumferential direction of the rotor, each of the magnetic groove sets comprises at least two magnetic steel grooves, a permanent magnet is provided in each of the magnetic steel grooves, and a magnetic tunnel is formed between the magnetic steel grooves, wherein an end of a magnetic tunnel in two adjacent magnetic tunnels is opposite to the wire groove and an end of another magnetic tunnel in two adjacent magnetic tunnels is opposite to the stator tooth.

The further technical solution of this disclosure is described hereinafter.

Both ends of the magnetic tunnel are opposite to the wire grooves or the stator teeth.

The end of the magnetic tunnel is opposite to a center of the wire groove; and the end of the other magnetic tunnel is opposite to a center of the stator tooth.

A magnetic tunnel is formed between two adjacent magnetic groove sets

A cross section of the magnetic steel groove is of arc-shaped or U-shaped, and an opening of the arc-shaped or U-shaped groove is towards a periphery of the stator in a radial direction of the magnet groove.

Clearances are respectively provided between two ends of the permanent magnet and the magnetic groove.

The permanent magnet has a flat plate structure or arc-shaped structure.

The permanent magnet has an arc-shaped structure, and a middle portion of the permanent magnet has a thickness greater than two ends of the permanent magnet.

The advantage or the principle of the disclosure is described hereinafter.

1. In the solution of the disclosure, the arbitrary corresponding relationship between the stator tooth and the magnetic tunnel in the existing design is changed. The corresponding relationship between the stator tooth and the magnetic tunnel is considered strictly in this disclosure. An end of a magnetic tunnel in two adjacent magnetic tunnels is opposite to the wire groove and an end of another magnetic tunnel in two adjacent magnetic tunnels is opposite to the stator tooth. The magnetic tunnel initially corresponds to the wire groove, and then turns to correspond to the stator tooth when the rotor runs in the operation. The other magnetic tunnel initially corresponds to the stator tooth, and then turns to correspond to the wire groove when the rotor runs in the operation. That is, the output torque of the permanent magnet synchronous motor may not be changed dramatically as the rotor thereof runs. Thus, the stability of the output torque of the permanent magnet synchronous motor may be improved and the noise and vibration may be reduced.

2. Clearances are respectively provided between two ends of the permanent magnet and the magnetic groove, which can prevent the demagnetization of the ends of the permanent magnet and avoid an impact during the assemblage of the permanent magnet.

3. The middle portion of the permanent magnet has a thickness greater than two ends of the permanent magnet, which can not only prevent the demagnetization of the permanent magnet, but also avoid the sliding of the permanent magnet in the magnetic groove.

Figure 1:
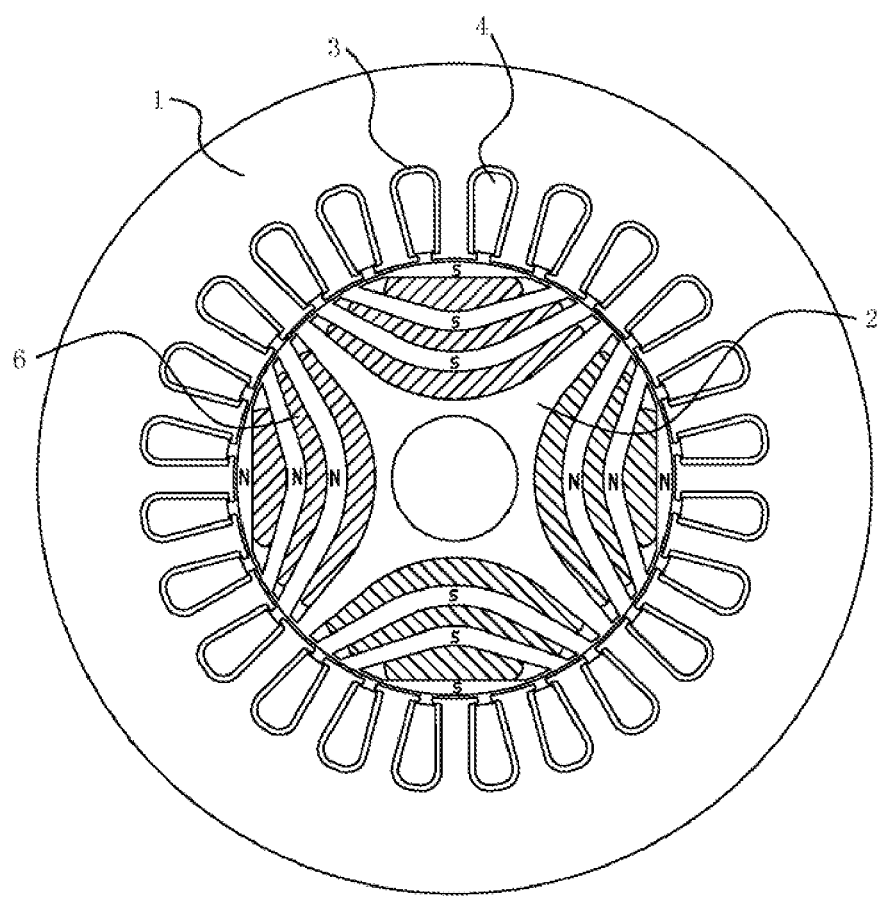
FIG. 1 is a section view of a permanent magnet synchronous motor according to a first embodiment of the disclosure.

REFERENCE NUMERALS IN THE DRAWINGS 1 stator, 2 rotor, 3 wire groove, 4 coil, 5 stator tooth, 6 magnetic groove set, 7 magnetic steel groove, 8 permanent magnet, and 9 magnetic tunnel.

DETAILED DESCRIPTION OF EMBODIMENTS

The embodiment of this disclosure is described in details hereinafter.

Figure 2:
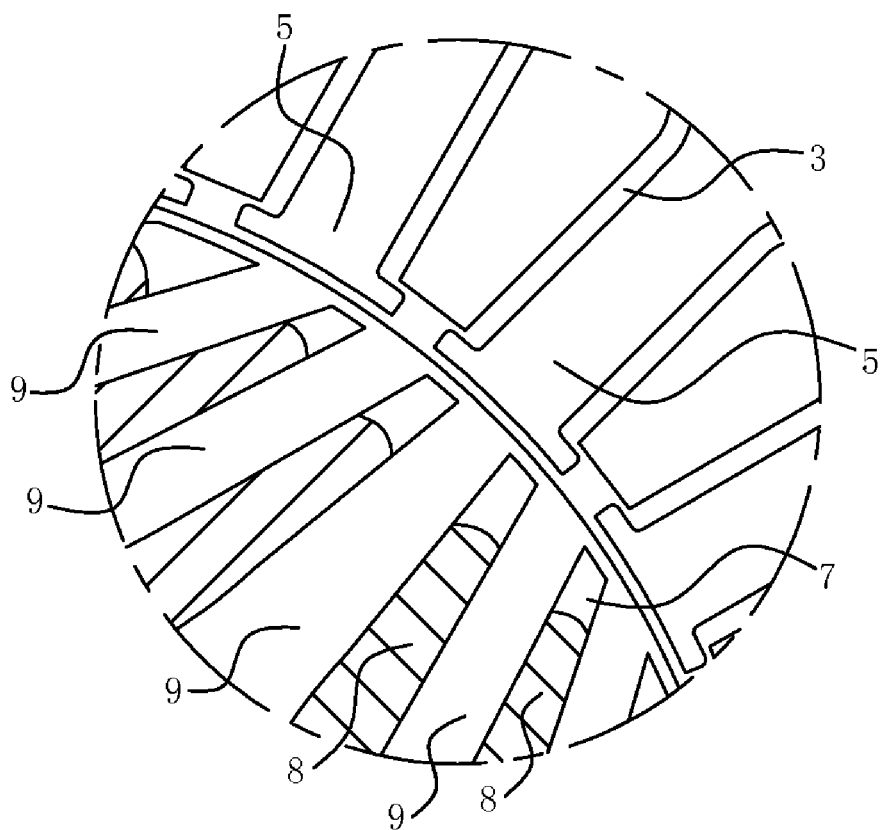
FIG. 2 is a partial enlarged drawing of the permanent magnet synchronous motor as shown in FIG. 1.

As shown in FIGS. 1 and 2, a permanent magnet synchronous motor includes a stator 1 and a rotor 2. Multiple wire grooves 3 are provided in the stator along a circumferential direction of the stator. Coils 4 are provided in each of the wire grooves 3. A stator tooth 5 is provided between adjacent wire grooves 3. Multiple magnetic groove sets 6 are provided in the rotor along a circumferential direction of the rotor 2. Each of the magnetic groove sets 6 includes at least two magnetic steel grooves 7. A permanent magnet 8 is provided in each of the magnetic steel grooves 7. A magnetic tunnel 9 is formed between the magnetic steel grooves 7. An end of a magnetic tunnel in two adjacent magnetic tunnels is opposite to the wire groove 3, and an end of another magnetic tunnel in two adjacent magnetic tunnels is opposite to the stator tooth 5.

The permanent magnet 8 includes an N-pole permanent magnet and an S-pole permanent magnet. The polarities of permanent magnets 8 in the magnetic groove set 6 are the same, and the polarities of permanent magnets 8 in adjacent magnetic groove sets 6 are alternately arranged according to N-pole and S-pole. Both ends of the magnetic tunnel 9 are opposite to the wire grooves 3 or the stator teeth 5. Specifically, the end of the magnetic tunnel 9 in two adjacent magnetic tunnels is opposite to a center of the wire groove 3, and the end of the other magnetic tunnel 9 in two adjacent magnetic tunnels is opposite to a center of the stator tooth 5. A magnetic tunnel 9 is also formed between two adjacent magnetic groove sets 6.

A cross section of the magnet steel groove 7 is of arc-shaped, and an opening of the arc-shaped groove 7 is towards a periphery of the stator in a radial direction of the magnet groove 7. The permanent magnet 8 is also of arc-shaped. A middle portion of the permanent magnet has a thickness greater than two ends of the permanent magnet. Clearances are respectively provided between two ends of the permanent magnet 8 and the magnetic steel groove 7.

The advantage or the principle of the disclosure is described hereinafter.

1. In the solution of the disclosure, the arbitrary corresponding relationship between the stator tooth 5 and the magnetic tunnel 9 in the existing design is changed. The corresponding relationship between the stator tooth and the magnetic tunnel is considered strictly in this disclosure. An end of a magnetic tunnel 9 in two adjacent magnetic tunnels is opposite to the wire groove 3 and an end of another magnetic tunnel 9 in two adjacent magnetic tunnels is opposite to the stator tooth 5. The magnetic tunnel 9 initially corresponds to the wire groove 3, and then turns to correspond to the stator tooth 5 when the rotor runs in the operation. The other magnetic tunnel 9 initially corresponds to the stator tooth 5, and then turns to correspond to the wire groove 3 when the rotor runs in the operation. That is, the output torque of the permanent magnet synchronous motor may not be changed dramatically as the rotor 2 thereof runs. Thus, the stability of the output torque of the permanent magnet synchronous motor may be improved and the noise and vibration may be reduced.

2. Clearances are respectively provided between two ends of the permanent magnet 8 and the magnetic groove, which can prevent the demagnetization of the ends of the permanent magnet 8 and avoid an impact during the assemblage of the permanent magnet 8.

3. The middle portion of the permanent magnet 8 has a thickness greater than two ends thereof, which can not only prevent the demagnetization of the permanent magnet 8, but also avoid the sliding of the permanent magnet 8 in the magnetic groove.

The embodiments described hereinabove are only specific embodiments of the present application, and should not be interpreted as limitation to the protection scope of the present application. Any equivalent replacements and improvements made within the principle of the present application are also deemed to fall into the protection scope of the present application.

What is claimed is:

1. A permanent magnet synchronous motor, comprising a stator and a rotor, wherein a plurality of wire grooves are provided in the stator along a circumferential direction of the stator, coils are provided in each of the wire grooves, and a stator tooth is provided between adjacent wire grooves; a plurality of magnetic groove sets are provided in the rotor along a circumferential direction of the rotor, each of the magnetic groove sets comprises at least two magnetic steel grooves, a permanent magnet is provided in each of the magnetic steel grooves, and a magnetic tunnel is formed between the magnetic steel grooves, and wherein an end of a magnetic tunnel in two adjacent magnetic tunnels is only opposite to one of the plurality of wire grooves and an end of the other magnetic tunnel in two adjacent magnetic tunnels is only opposite to the stator tooth adjacent to the one of the wire grooves.

2. The permanent magnet synchronous motor according to claim 1, wherein both ends of the same magnetic tunnel are opposite to the wire grooves or the stator teeth.

3. The permanent magnet synchronous motor according to claim 1, wherein the end of the magnetic tunnel in two adjacent magnetic tunnels is opposite to a center line of the wire groove; and the end of the other magnetic tunnel in two adjacent magnetic tunnels is opposite to a center line of the stator tooth.

4. The permanent magnet synchronous motor according to claim 1, wherein a magnetic tunnel is formed between two adjacent magnetic groove sets.

5. The permanent magnet synchronous motor according to claim 2, wherein a magnetic tunnel is formed between two adjacent magnetic groove sets.

6. The permanent magnet synchronous motor according to claim 3, wherein a magnetic tunnel is formed between two adjacent magnetic groove sets.

* * * * *